(12) United States Patent
Warnke et al.

(10) Patent No.: US 8,794,108 B2
(45) Date of Patent: Aug. 5, 2014

(54) AUTOMATIC TRANSMISSION FLUID ACCUMULATOR REPLACEMENT ASSEMBLY

(75) Inventors: Robert C. Warnke, Spooner, WI (US); MacKenzie M. Campbell, Baltimore, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 482 days.

(21) Appl. No.: 13/159,014

(22) Filed: Jun. 13, 2011

(65) Prior Publication Data

US 2012/0312406 A1    Dec. 13, 2012

(51) Int. Cl.
| *F16H 47/00* | (2006.01) |
| *F16L 55/04* | (2006.01) |
| *B23P 11/00* | (2006.01) |
| *F15B 1/04* | (2006.01) |
| *F16H 61/00* | (2006.01) |
| *F16L 55/05* | (2006.01) |

(52) U.S. Cl.
CPC . *B23P 11/00* (2013.01); *F15B 1/04* (2013.01); *F16H 61/0021* (2013.01); *F16L 55/05* (2013.01)
USPC .......................................... 74/730.1; 138/31

(58) Field of Classification Search
USPC ....... 74/730.1, 606 R; 192/55.4, 59; 188/124, 188/128; 138/30, 31; 60/413, 327
See application file for complete search history.

(56) References Cited

U.S. PATENT DOCUMENTS

| 4,364,285 | A | * | 12/1982 | Morisawa et al. | ........... 74/606 R |
| 4,716,812 | A | * | 1/1988 | Koerner et al. | ............. 91/417 R |
| 4,867,294 | A | * | 9/1989 | de Tuesta | .................... 192/109 F |
| 4,881,725 | A | * | 11/1989 | Shioda et al. | ................. 267/179 |
| 5,103,642 | A | * | 4/1992 | Suzuki et al. | ................... 60/413 |
| 5,297,994 | A | * | 3/1994 | Suzuki et al. | ................... 464/27 |
| 6,390,133 | B1 | * | 5/2002 | Patterson et al. | ................ 138/31 |
| 2002/0035832 | A1 | * | 3/2002 | Nakamura et al. | .............. 60/413 |
| 2006/0225800 | A1 | * | 10/2006 | Weber | .............................. 138/31 |

* cited by examiner

*Primary Examiner* — Troy Chambers
*Assistant Examiner* — Jake Cook
(74) *Attorney, Agent, or Firm* — Downs Rachlin Martin PLLC

(57) ABSTRACT

A fluid accumulator assembly used with 2002 to 2005 model years of ZF Getriebe's GmbH ZF-6HP19, ZF-6HP26, ZF-6HP32 automatic transmissions, and model years up to 2011 of Ford's 6R60 automatic transmissions. The fluid accumulator assembly includes a piston that can be received into a bore that is in fluid communication with a solenoid-controlled fluid circuit of the transmission. The fluid accumulator assembly also includes a compression spring sized and configured to fit within the piston, and used to provide an urging force to the piston.

9 Claims, 3 Drawing Sheets

AUTOMATIC TRANSMISSION FLUID ACCUMULATOR REPLACEMENT ASSEMBLY

FIELD OF THE INVENTION

The present invention generally relates to the field of automatic transmissions. In particular, the present invention is directed to an automatic transmission accumulator replacement assembly.

BACKGROUND

Automatic transmissions include, among other components, a planetary gear system that can be adjusted using pressurized transmission fluid. The automatic transmission fluid is channeled and controlled in order to facilitate proper operation of the automatic transmission.

SUMMARY OF THE DISCLOSURE

In one implementation, the present disclosure is directed to a fluid accumulator assembly configured and dimensioned for use with an automatic transmission selected from the group consisting of 2002 to 2005 model years of ZF Getriebe's GmbH ZF-6HP19, ZF-6HP26, ZF-6HP32, and model years up to 2011 of Ford's 6R60 automatic transmissions, the transmission including a valve body defining a fluid circuit and a bore, the fluid circuit having connected to it at least one brake, at least one valve, and at least one clutch used for controlling a plurality of gears. The fluid accumulator assembly comprises a piston sized and configured for sliding receipt in the bore, said piston having a straight-walled interior chamber and in fluid communication with a solenoid-controlled fluid circuit of the transmission; and a compression spring sized and configured to fit within said straight-walled interior chamber of said piston, said spring used to urge said piston in a first direction in said piston cylinder.

In another implementation, the present disclosure is directed to a fluid accumulator replacement assembly used with a solenoid-controlled fluid circuit in an automatic transmission valve body. The fluid accumulator replacement assembly comprises a piston having a length of less than approximately 0.5 inches, and a substantially uniform inner diameter of less than approximately 0.5 inches said piston sized and configured to fit within an accumulator piston cylinder in fluid communication with a solenoid-controlled fluid circuit disposed within a valve body of one of model year 2002 to 2005 of ZF Getribe'GmbH ZF-6HP19, ZF-6HP26, ZF-6HP32, or Ford's 6R60 automatic transmissions; and a small spring having a length of less than approximately 0.5 inches and a diameter of less than approximately 0.5 inches sized and configured to fit within said inner diameter of said piston, said spring used to provide an urging force to said piston, and having a spring constant in the range of approximately 190 pounds/inch to approximately 210 pounds/inch.

In yet another implementation, the present disclosure is directed to a method damping shocks transmitted through automatic transmission fluid in a solenoid-controlled fluid circuit of a model year 2002 to 2005 of ZF Getriebe's GmbH ZF-6HP19, ZF-6HP26, ZF-6HP32 or Ford's 6R60 automatic transmission, the fluid circuit including an accumulator piston cylinder. The method comprises placing a closed and ground compression spring into the accumulator piston cylinder, the compression spring sized and configured to fit within an inner diameter of a large-bore piston; and placing the large-bore piston into the accumulator piston cylinder, the large-bore piston disposed around the closed and ground compression spring within the accumulator piston cylinder.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Embodiments of the present invention disclosed herein include apparatus, and methods for making and using a fluid accumulator assembly for use in connection with a solenoid-controlled fluid circuit in an automatic transmission. Certain exemplary embodiments disclosed herein are particularly well suited for use with 2002-2005 versions of ZF Getriebe's GmbH ZF-6HP19, ZF-6HP26, ZF-6HP32, and the Ford's 6R60 automatic transmissions. A fluid accumulator can be used within a solenoid-controlled fluid circuit of an automatic transmission in order to protect the various elements of the transmission from undesirable pressure and volume changes transmitted through the transmission fluid. The fluid accumulator functions by operating as a "moveable wall," which moves in response to the pressure or volume changes in the fluid, thereby increasing or decreasing the total volume of the fluid circuit as needed. In one exemplary embodiment disclosed herein, a fluid accumulator includes a piston that is responsive to, primarily, pressure waves that are initiated by, for example, the actuation of a controlled component within the circuit and transmitted through the fluid. Furthermore, in this exemplary embodiment, the piston can accommodate the pressure wave through use of a closed-and-ground metallic spring that is disposed within a piston/cylinder assembly.

Figure 1:
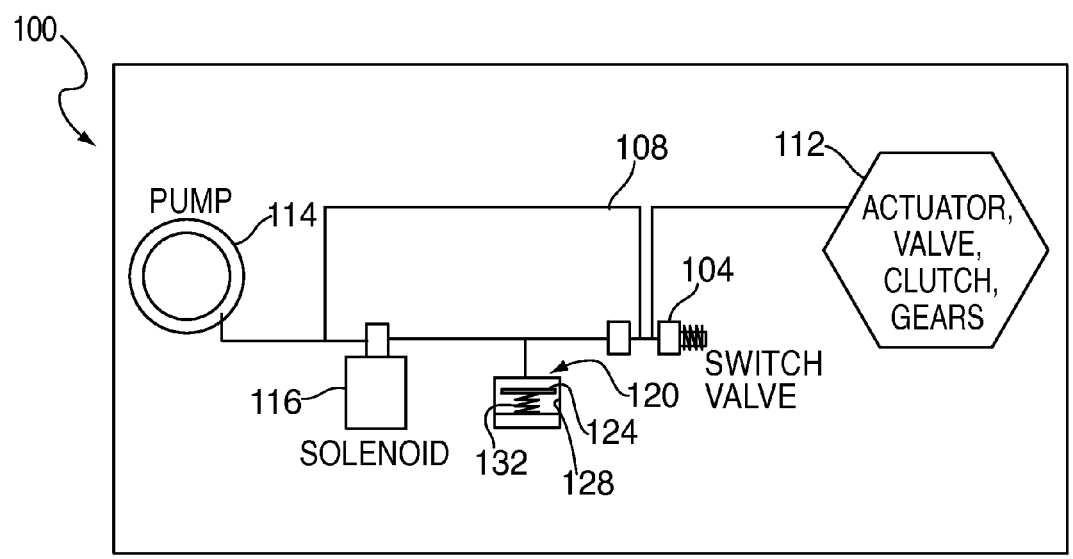
FIG. 1 is a schematic fluid circuit diagram of an exemplary automatic transmission, which may employ the present invention.

Turning now to the figures, FIG. 1 depicts a schematic fluid circuit diagram of an exemplary type automatic transmission 100. In this example, a valve 104 is in fluid communication with a solenoid-controlled fluid circuit 108 and planetary gears, actuator, valve, and clutch 112. Valve 104 uses the pressure supplied to the transmission fluid in fluid circuit 108 by pump 114 to change gear ratios in planetary gears 112, thereby providing a range of speeds to a vehicle using automatic transmission 100. As mentioned above, actuating valve 104 can send a wave of pressure change throughout the transmission fluid within fluid circuit 108. This pressure change can damage components connected to fluid circuit 108. To reduce the risk of damage, the change is accommodated by a fluid accumulator 120, connected to fluid circuit 108 proximate to solenoid 116.

In the example shown in FIG. 1, and as described in more detail below, fluid accumulator 120 can accommodate pressure and volume changes transmitted through the transmission fluid by using a piston 124 that is slideably engaged with a piston cylinder 128 and moveable about a neutral position 216 (shown in FIG. 2, below) using a closed-and-ground compression spring 132. By way of illustration, valve 104 in solenoid-controlled fluid circuit 108 can close, transmitting a pressure wave through the automatic transmission fluid disposed within the fluid circuit. Fluid accumulator 120 can relieve this additional pressure within fluid circuit 108 by receiving the pressure wave at piston crown 204 (illustrated in FIG. 2) that shifts piston 124 downward within piston cylinder 128, thereby compressing spring 132. By acting as a "moveable wall" within fluid circuit 108, fluid accumulator 120 increases the volume of the fluid circuit, thereby reducing the pressure experienced by the fluid circuit and the components connected thereto.

While automatic transmission 100 depicted in FIG. 1 has only one such fluid accumulator 120 proximate to solenoid 116, a skilled artisan will appreciate that any number of fluid accumulators may be connected to any number of solenoids. Also, while FIG. 1 depicts fluid accumulator 120 as proximate to solenoid 116, a skilled artisan will appreciate that the fluid accumulator may be connected to a fluid circuit at any convenient point that will also accommodate pressure and volume changes transmitted through the transmission fluid, as described above.

In another example illustrating the teachings of the present disclosure, fluid accumulator 120 can respond to opening of valve 104. In this example, the volume of fluid circuit 108 increases upon the opening of valve 104, thereby causing the pressure in the automatic transmission fluid to drop within the fluid circuit. Fluid accumulator 120 responds to this pressure drop by, similar to the scenario described above, acting as a "moveable wall" and thereby reducing the volume of fluid circuit 108. In this situation, as the pressure within fluid circuit 108 drops, piston 124 is urged outward from piston cylinder 128 by closed-and-ground spring 132. Because piston 124 is urged outward from cylinder 128, it reduces the volume of fluid circuit 108, thereby increasing the pressure of the transmission fluid. By responding to the drop in pressure in fluid circuit 108, fluid accumulator 120 can protect components connected to the fluid circuit, such as planetary gears 112, from malfunction and/or damage caused by this change in pressure.

Figure 2:
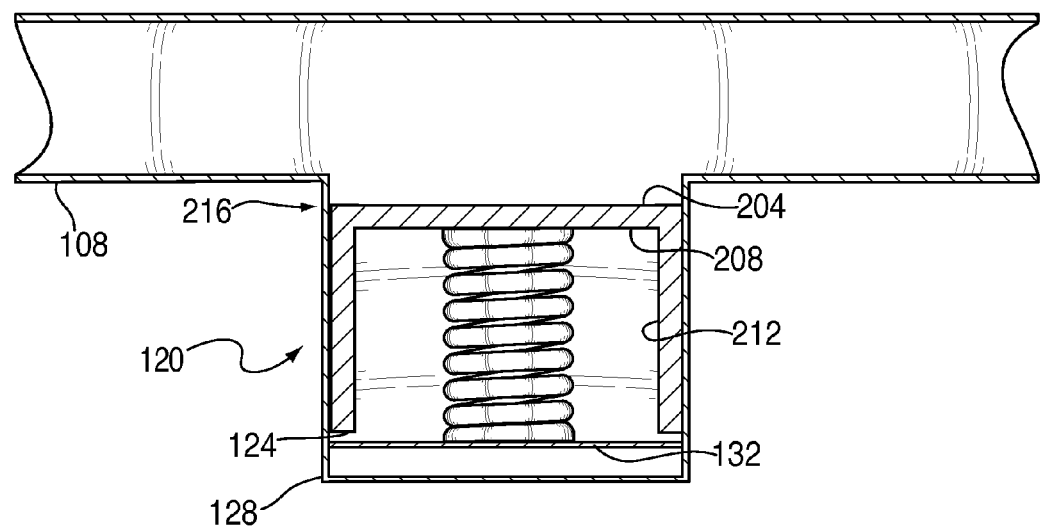
FIG. 2. is a schematic cross-section of a fluid accumulator in a fluid circuit according to an embodiment of the present invention.

FIG. 2 depicts a detailed view of an embodiment of fluid accumulator 120 that is in fluid communication with fluid circuit 108. In this embodiment, fluid accumulator 120 is formed by the insertion of piston 124 and closed-and-ground spring 132 into piston cylinder 128. Pressure and volume changes that are transmitted through the transmission fluid within fluid circuit 108 can be received at piston crown 204. The forces induced by these pressure and volume changes are transmitted through piston crown 204 to piston 124, piston crown-backside 208 and spring 132.

Spring 132 is in communication with piston 124 at piston crown-backside 208 and disposed within straight-walled inner diameter 212. Piston 124 can support straight-walled inner diameter 212 because spring 132 provides an adequate urging force when directly in contact with piston crown backside 208. Spring 132 provides an urging force to piston 124 that is balanced by the steady-state pressure of the transmission fluid within fluid circuit 108, thereby maintaining the piston at approximately neutral position 216. As the pressure of the transmission fluid within fluid circuit 108 increases or decreases, spring 132 can compress or extend, thereby enabling piston 124 to slide within cylinder 128 in response to the pressure change in the transmission fluid. This responsive movement of piston 124 can aid in maintaining an approximate desired pressure of the transmission fluid within fluid circuit 108.

Continuing with FIG. 2, when valve 104 opens and the volume of fluid circuit 108 increases, the pressure drop experienced at piston crown 204 results in spring 132 urging piston 124 past neutral position 216, thereby reducing the volume of the fluid circuit and restoring an approximately steady-state pressure of the transmission fluid within the fluid circuit. Similarly, when valve 104 closes and produces a pressure wave that propagates through the transmission fluid in fluid circuit 108, the pressure increase experienced at piston crown 204 compresses spring 132 and urges piston 124 away from neutral position 216 and further into piston cylinder 128. This increases the volume of fluid circuit 108 and restores the approximately steady-state pressure of the transmission fluid within the fluid circuit.

Figure 3:
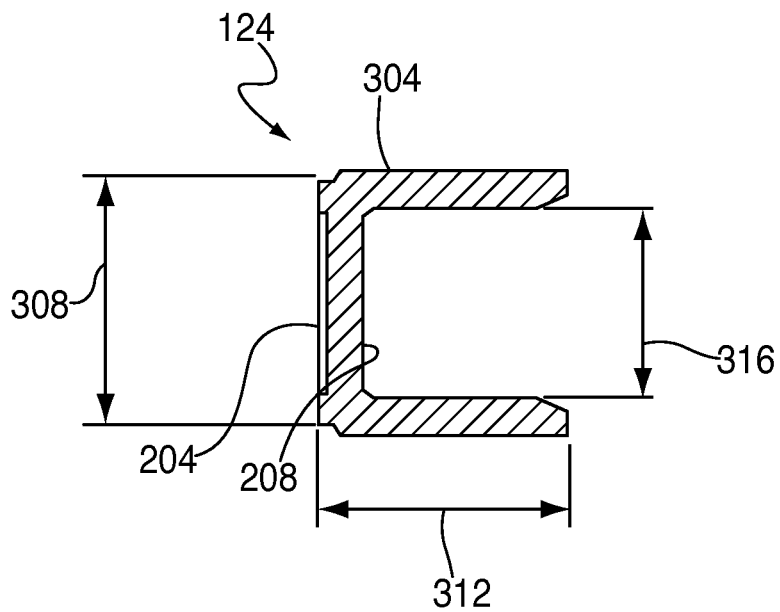
FIG. 3 is a cross-sectional view of a piston of a fluid accumulator according to an embodiment of the present invention.

FIG. 3 depicts a cross section of an embodiment of piston 124 and illustrates the various parts of the piston. As discussed previously, piston 124 has a piston crown 204 that confronts the transmission fluid in fluid circuit 108 and receives changes in pressure that are transmitted through the transmission fluid. Piston crown 204 is connected to cylindrical piston skirt 304 that forms the sidewalls of the piston. Piston skirt 304 is adjacent to the sidewalls of piston cylinder 128 in assembled fluid accumulator 120 as shown in FIG. 2. Piston crown-backside 208 is an opposing face of piston crown 204 and, as described above in the context of FIG. 2, is in communication with spring 132.

Piston 124 can have an outside diameter 308 of approximately less than 0.75 inches although other values of the diameter are equally possible depending on the design of fluid accumulator 120 and the design of fluid circuit 108. In this embodiment of piston 124, the diameter is approximately 0.43 inches. Piston 124 can have a length 312 of approximately less than 0.75 inches although, as with diameter 308, other lengths are possible depending on the design of fluid accumulator 120 and fluid circuit 108. In this embodiment, length 312 is approximately 0.45 inches. Also, in this embodiment of piston 124, piston crown 204 and piston skirt 304 are approximately 0.1 inches thick although other embodiments of piston 124 may have other thicknesses. In this embodiment, piston 124 is fabricated from anodized aluminum but other materials are equally applicable including un-anodized aluminum, aluminum alloys, stainless steel, carbon steel, surgical steel, alloys thereof and many others. A person skilled in the art will appreciate the wide variety of materials that can be used to fabricate piston 124.

Figure 4:
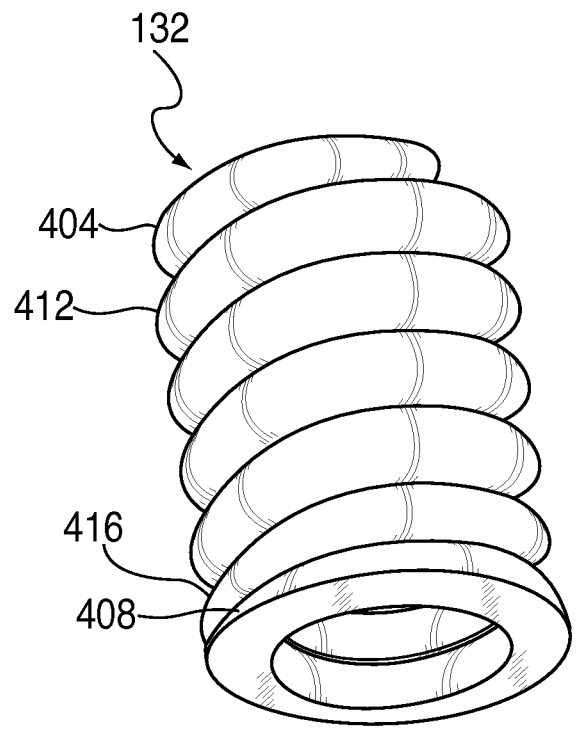
FIG. 4 is a perspective view of a spring of a fluid accumulator according to an embodiment of the present invention.

Turning now to FIG. 4, an embodiment of spring 132 is depicted. In this embodiment, spring 132 is a closed-and-ground spring. The ends of spring 132 have been ground flat, which, unlike unground springs, provides additional surface area with which the spring may contact a confronting face. This additional surface area can typically provide added stability when spring 132 is either compressed or extended. Furthermore, terminal windings 404 and 408 of spring 128 are "closed;" that is, the last rotation of spring 132 is in contact with its adjacent winding, which in this example are windings 412 and 416. Because terminal windings 404 and 408 are in contact with adjacent windings 412 and 416, they cannot be compressed. This lack of compressibility of terminal windings 404 and 408 can add additional stability to spring 128 when compressed, extended, or even in its neutral position.

Continuing with FIG. 4, the embodiment of spring 132 shown can be fabricated from tempered steel. A person skilled in the art will appreciate that many materials may be used to fabricate spring 132 including untempered steel, stainless steel, carbon steel, aluminum, spring steel, alloys thereof, and others. This embodiment of spring 132 can be approximately 0.36 inches long, have an outside diameter of approximately 0.3 inches, be fabricated from wire approximately 0.55 inches in diameter, have approximately 4.5 active coils and a total of approximately 6.5 coils. Furthermore, the spring constant of spring 132 can be approximately in the range approximately 190 pounds/inch to approximately 210 pounds/inch. However, a person having ordinary skill in the art will appreciate that spring 132 can assume any length, outside diameter, wire diameter, spring constant, and have any number of active and total coils.

Figure 5:
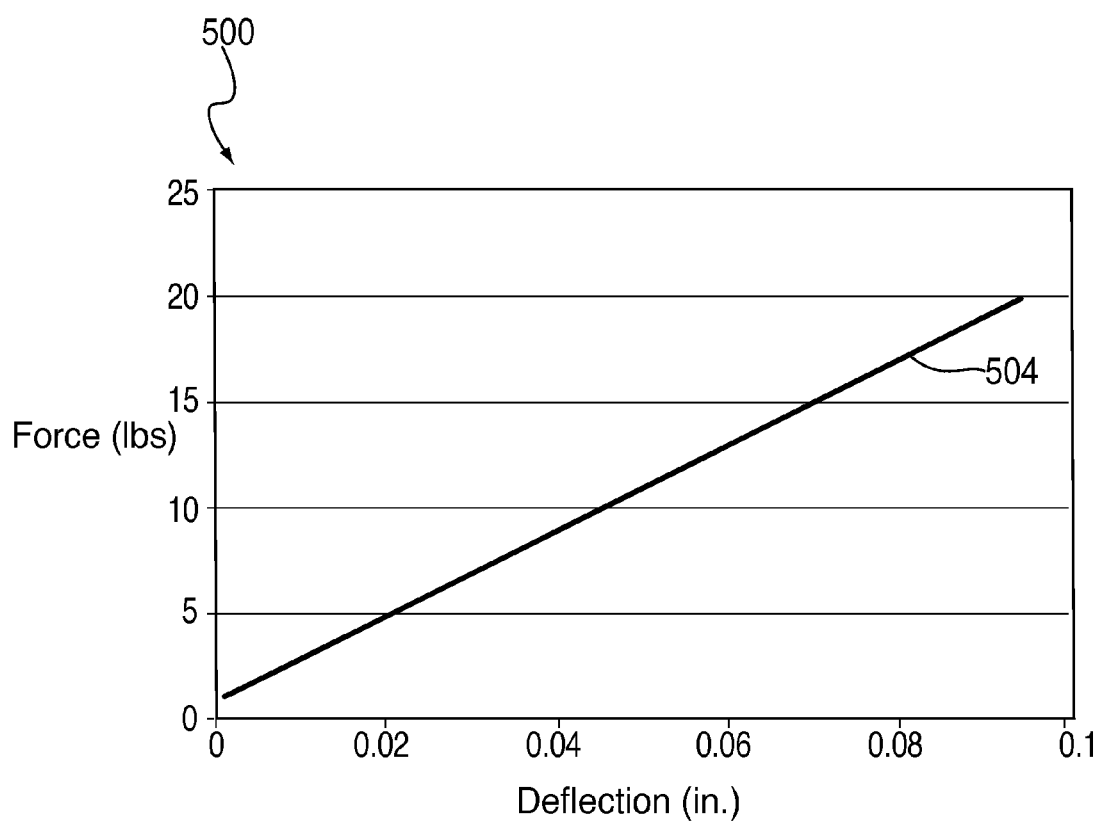
FIG. 5 is a graphical representation of the deflection vs. force for an embodiment of an accumulator piston according to the present invention.

Turning now to FIG. 5, a graph 500 of the performance of fluid accumulator 120 is displayed. As can be seen in line 504, fluid accumulator 120 provides a linear deflection over a range of forces. One advantage of the linear response of fluid accumulator 120 shown by line 504 in graph 500 of FIG. 5 is that the protection provided by the fluid accumulator from pressure variations transmitted by transmission fluid through solenoid-controlled fluid circuit 108 is linear, uniform and predictable. This feature is advantageous because it enables fluid accumulator 120 to provide the same amount of protection to other components connected to fluid circuit 108 over a wide range of forces and deflections.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A fluid accumulator assembly configured and dimensioned for use with an automatic transmission selected from the group consisting of 2002 to 2005 model years of ZF Getriebe's GmbH ZF-6HP19, ZF-6HP26, ZF-6HP32, and model years up to 2011 of Ford's 6R60 automatic transmissions, the transmission including a valve body defining a solenoid-controlled fluid circuit and a bore, the solenoid-controlled fluid circuit having connected to it at least one brake, at least one valve, and at least one clutch used for controlling a plurality of gears, the fluid accumulator assembly comprising:
a piston sized and configured for sliding receipt in the bore, said piston having a straight-walled interior chamber and in fluid communication with the solenoid-controlled fluid circuit of the transmission; and
a compression spring sized and configured to fit within said straight-walled interior chamber of said piston, said compression spring used to urge said piston in a first direction in said piston cylinder.

2. A fluid accumulator assembly according to claim 1 wherein said spring has a spring constant in the range of approximately 190 pounds/inch to approximately 210 pounds/inch.

3. A fluid accumulator assembly according to claim 1, wherein said spring is approximately 0.3 inches long, has an outside diameter of approximately 0.3 inches, and is fabricated from wire approximately 0.05 inches in outside diameter.

4. A fluid accumulator assembly according to claim 3, wherein said spring is approximately 0.36 inches long and has an outside diameter of approximately 0.30 inches.

5. A fluid accumulator assembly according to claim 1, wherein said spring has approximately 4.5 active coils and approximately 6.5 total coils.

6. A fluid accumulator replacement assembly used with a solenoid-controlled fluid circuit in an automatic transmission valve body, the fluid accumulator replacement assembly comprising:
a piston having a length of less than approximately 0.5 inches, and a substantially uniform inner diameter of less than approximately 0.5 inches said piston sized and configured to fit within an accumulator piston cylinder in fluid communication with the solenoid-controlled fluid circuit disposed within a valve body of one of model year 2002 to 2005 of ZF Getriebe's GmbH ZF-6HP19, ZF-6HP26, ZF-6HP32, or Ford's 6R60 automatic transmissions; and
a small spring having a length of less than approximately 0.5 inches and a diameter of less than approximately 0.5 inches sized and configured to fit within said inner diameter of said piston, said spring used to provide an urging force to said piston, and having a spring constant in the range of approximately 190 pounds/inch to approximately 210 pounds/inch.

7. A method damping shocks transmitted through automatic transmission fluid in a solenoid-controlled fluid circuit of a model year 2002 to 2005 of ZF Getriebe's GmbH ZF-6HP19, ZF-6HP26, ZF-6HP32 or Ford's 6R60 automatic transmission, the fluid circuit including an accumulator piston cylinder, the method comprising:
placing a closed and ground compression spring into the accumulator piston cylinder, the compression spring sized and configured to fit within an inner diameter of a large-bore piston; and
placing the large-bore piston into the accumulator piston cylinder, the large-bore piston disposed around the closed and ground compression spring within the accumulator piston cylinder.

8. A method according to claim 7, wherein said placing a closed and ground compression spring includes using a compression spring having a spring constant in the range of approximately 190 pounds/inch to approximately 210 pounds/inch.

9. A method according to claim 7, wherein said placing a compression spring includes using a compression spring approximately 0.36 inches long and having an outside diameter of approximately 0.30 inches.

* * * * *